3,003,729
PORTABLE PROJECTION SCREEN APPARATUS
Edward J. Petrick, Park Ridge, Ill., assignor to Knox Manufacturing Company, a corporation of Illinois
Filed Aug. 17, 1959, Ser. No. 834,079
14 Claims. (Cl. 248—171)

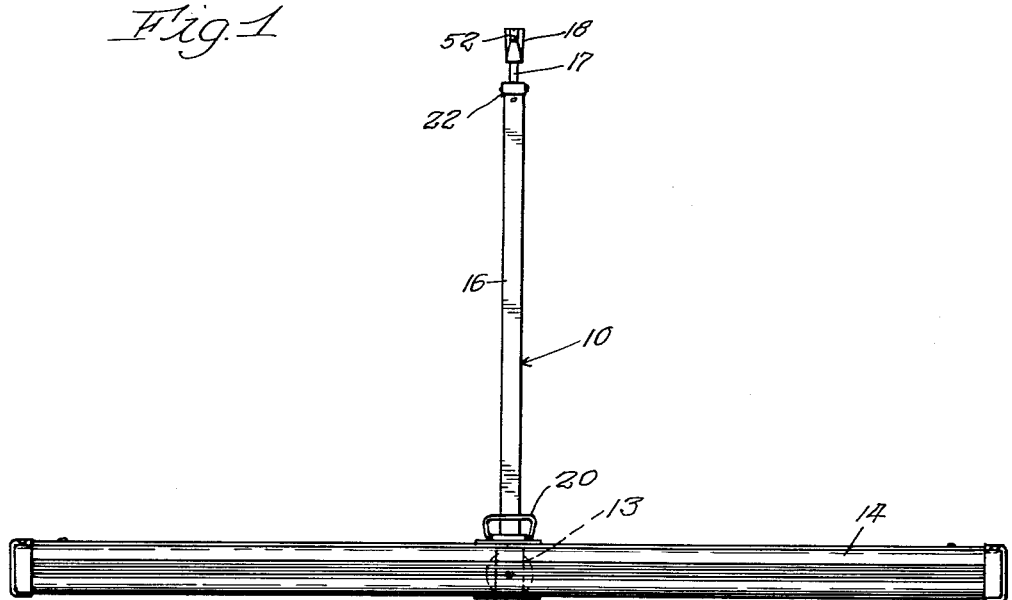
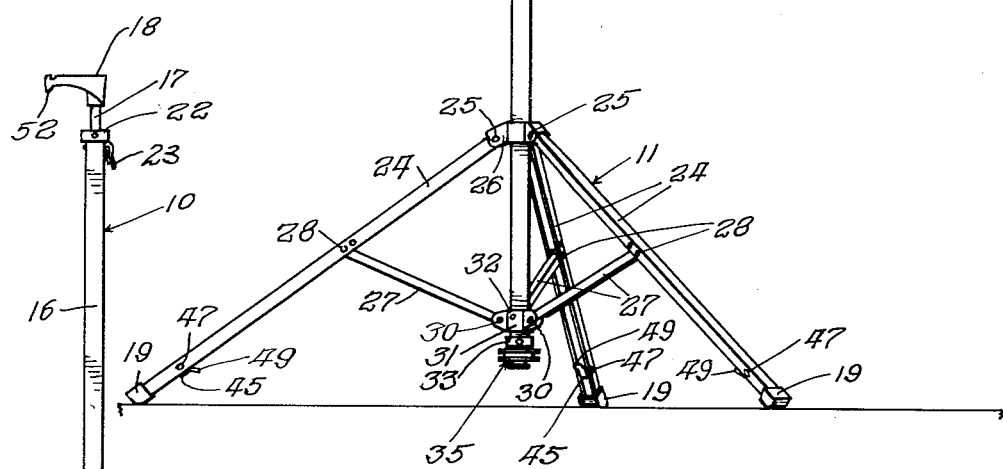
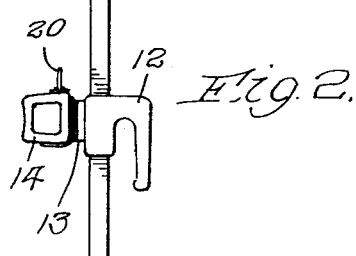

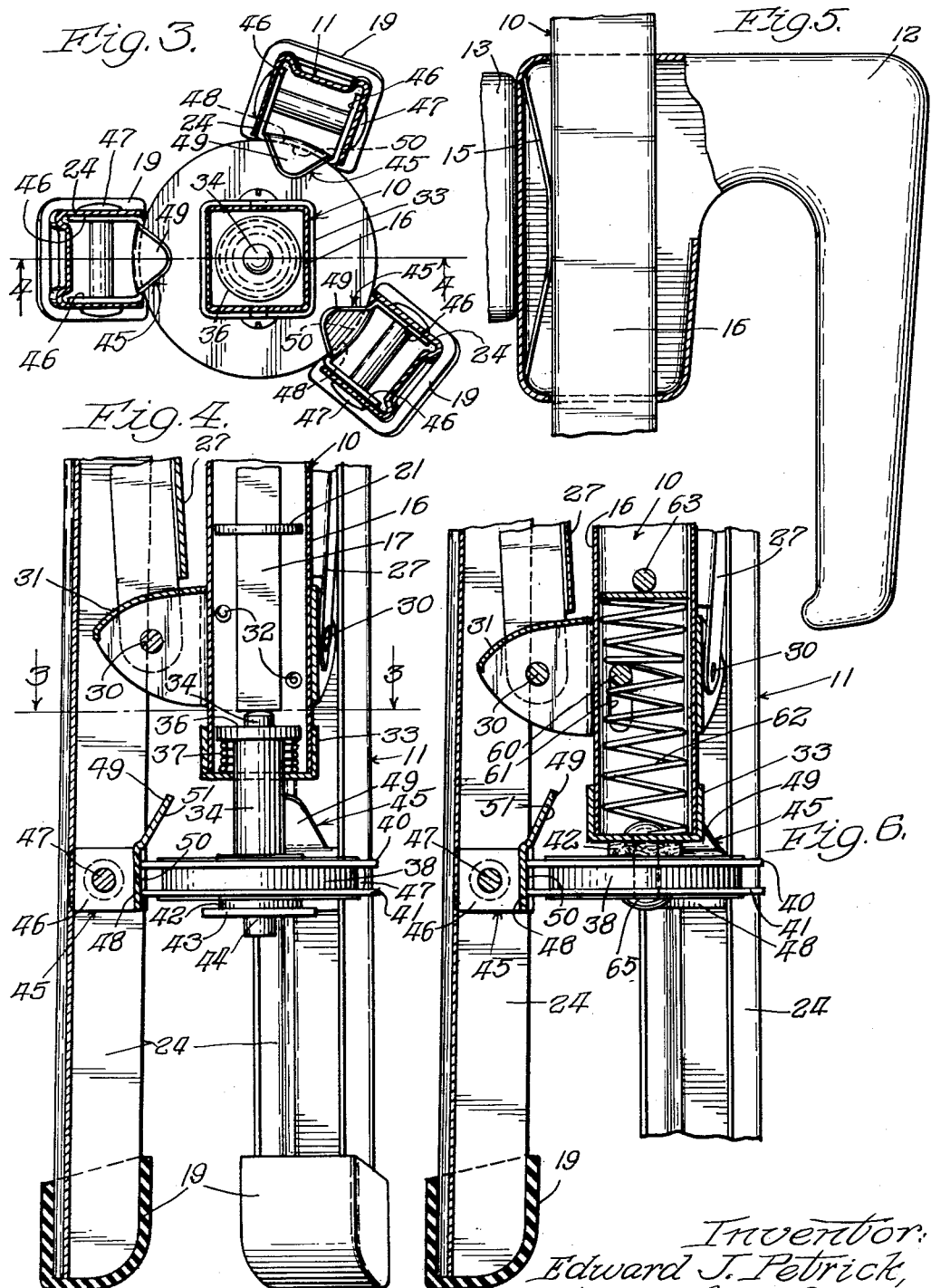

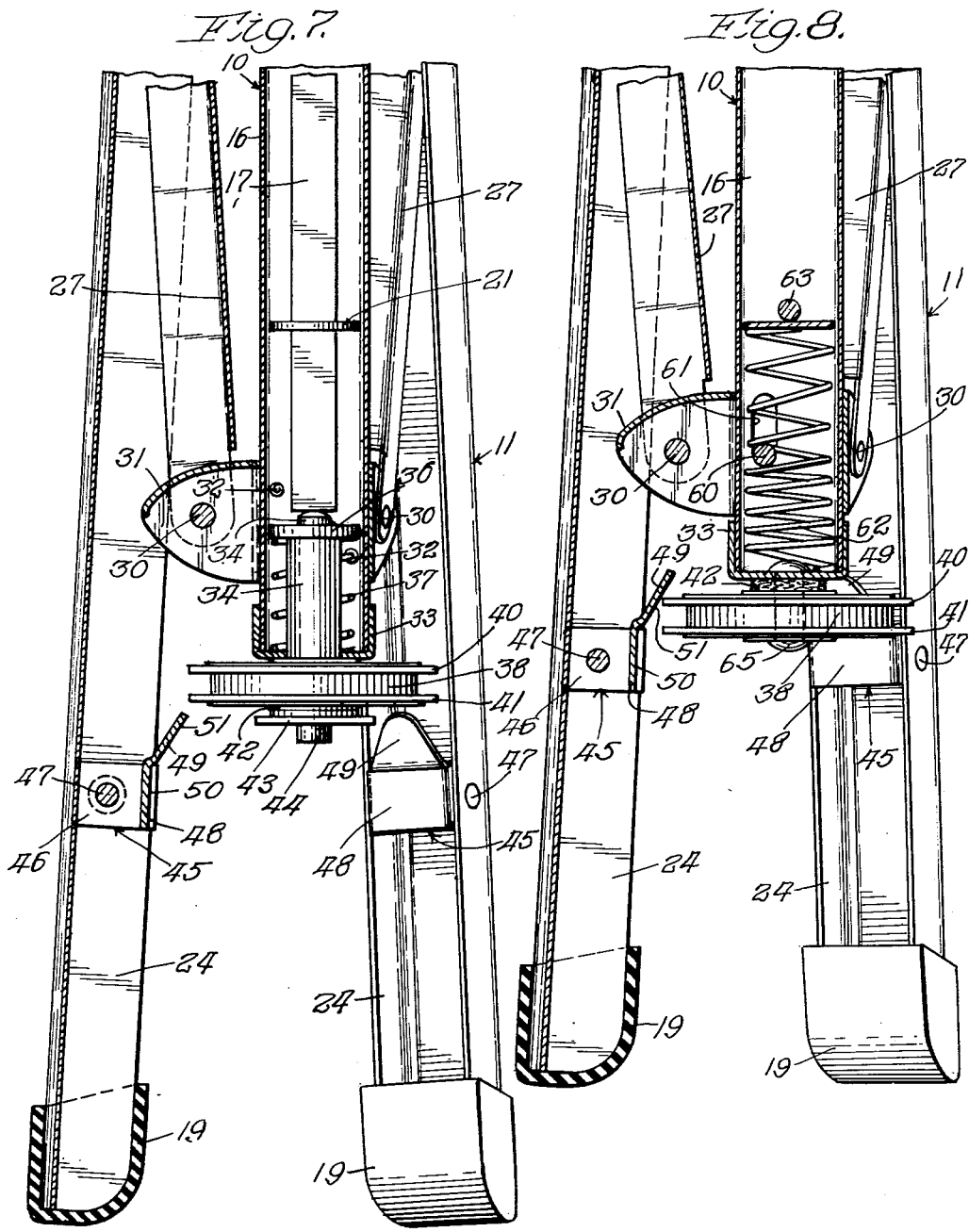

The present invention relates to a stand for a portable movie screen, and more particularly to a magnetic latching structure for retaining the legs of the stand in closed position when the stand is not in use.

The primary object of the present invention is to provide a new and improved latching mechanism for a leg unit of a stand which will quietly and effectively latch the leg unit in closed position adjacent the stand and will facilitate the release of the leg unit when it is desired to place the stand in upright supporting position.

Another object is to provide a magnetic latching structure for such a leg unit, the latching structure embodying a ceramic magnet and cooperating latching elements for holding the leg unit in closed position.

A further object is to provide a magnetic latching structure for the leg unit of a stand in which relative movement between the leg unit and the stand disengages the cooperating portions of the magnetic latching structure to permit the leg unit to be swung outwardly to supporting position.

Still another object is to provide a stand for a portable movie screen in which the release of a single clamping member will release the leg unit for movement to open supporting position and will release the screen casing for automatic movement to horizontal operating position.

Yet another object of the present invention is to provide a magnetic latch structure and cooperating camming surfaces on the leg unit so that relative movement between the magnetic latching structure and the leg unit will cause the camming surfaces to disengage the latching structure and throw the leg members outwardly to supporting position.

Still another object is to provide a magnetic latching member having laterally extending portions for magnetically engaging ferrous latching elements on the leg unit when in closed position, said laterally extending portions positioning the leg unit in closed position so that disengagement of the latching member and elements permits the leg unit to move by gravity to outwardly-swung supporting position.

A further object is to provide a stand having a leg unit provided with a magnetic latching structure having mating abutting ferrous surfaces for holding the leg unit in closed position.

The invention is illustrated in a preferred embodiment in the accompanying drawings, in which:

FIG. 1 is a side elevational view showing the movie screen stand in upright operative position with the movie screen casing having swung to horizontal operative position;

FIG. 2, a fragmentary side elevational view of the movie screen stand of FIG. 1;

FIG. 3, an enlarged sectional view taken as indicated on line 3—3 of FIG. 4 showing the leg unit in latched, closed position adjacent the standard;

FIG. 4, an enlarged fragmentary sectional view taken as indicated on line 4—4 of FIG. 3;

FIG. 5, an enlarged fragmentary elevational view, with certain portions broken away for clarity of illustration, of the handle member of the movie screen stand shown in FIG. 2;

FIG. 6, an enlarged fragmentary elevational view, partly in section, of a modified magnetic latching structure and leg unit, the view being made similarly to the showing of FIG. 4;

FIG. 7, a fragmentary elevational view, partly in section, illustrating the release of the leg unit of FIG. 4 from latched, closed position; and FIG. 8, a fragmentary elevational view, partly in section, illustrating the release of the leg unit of FIG. 6 from latched, closed position.

In the embodiment illustrated, a standard generally designated 10, is provided with a leg unit, generally designated 11, for supporting the standard in upright position. A handle member 12 is shown mounted on the standard and is provided with a mounting portion 13 to which a conventional screen casing 14 is centrally pivoted in a well-known manner. The mounting portion 13 of the handle 12 and the casing 14 are preferably both formed in the manner shown in the copending application of Edward J. Petrick and Russell E. Petrick, Serial No. 799,286, entitled "Portable Movie Screen," filed March 13, 1959, so that the casing when released from vertical position adjacent the standard 10, will automatically pivot to horizontal operative position as shown in FIG. 1.

It is sufficient for the present disclosure to merely state that the casing 14 is tubular and is provided with a longitudinal slot, not shown, through which a flexible movie screen with a reflecting surface may be drawn to exposed position. The casing 14 houses a spring-wound curtain-type roller or reel which is journaled therein, and on which the flexible screen is wound when in closed position. The roller or reel is formed so as to normally urge the flexible screen toward closed position within the casing 14 in a conventional manner.

As best shown in FIG. 5, the handle member is preferably slidably mounted on the standard 10 so that the position of the casing 14 may be elevated or depressed as desired. As herein shown, a prestressed leaf spring 15 is disposed within the handle member 12 so as to normally bear against the forward face of the standard 10 and to frictionally retain the handle member in varying positions of elevation on the standard 10.

The standard 10 includes a main elongated tubular member 16 which is adapted to slidably receive a telescoping rod 17 which carries a bail support 18 at its free end from which a bail member 20 may be supported to suspend the reflecting screen in exposed position. As shown in FIG. 4, the lower end of the telescoping rod 17 is preferably provided with a guide washer 21 to stabilize the lower end of the telescoping rod 17 during its sliding movement within the tubular member 16.

The upper end of the tubular member 16 is provided with an aperture cap 22 through which the telescoping rod 17 may be caused to slide. The upper end of the tubular member 16 is also preferably provided with a clamping member 23 of a type now common in the art. The clamping member 23 is normally urged into gripping engagement with the telescoping rod 17 so that the telescoping rod 17 may be pulled outwardly of the tubular member 16 and be held in various positions of extension with respect to the tubular member 16.

As stated above, the standard 10 is normally held in upright position by the leg unit 11. The leg unit 11 includes a plurality of leg members 24 each pivotally secured at 25 to a collar member 26 which embraces and is slidable on the tubular member 16. Each leg member 24 may have a decorative plastic tip 19 covering its free end. A number of bracing links 27 are each pivotally secured at their opposite ends at 28 and 30 to the midpoint of the channel-shaped leg members 24 and to a fitting 31 secured adjacent the lower end of the tubular member 16.

In the first embodiment, and as best illustrated in FIG. 4, the fitting 31 is fixedly secured to the lower end of the tubular member 16 by a pair of machine screws 32. It is thus apparent that the leg unit may be moved from its spread-apart supporting position (shown in FIG. 1) to a closed position in which the leg members and bracing links are adjacent the tubular member 16 by merely lifting upwardly on the slidable collar member 26.

The portable movie screen is provided with cooperating means on the standard 10 and the leg unit 11 for retaining the leg unit in closed position and for permitting its movement to spread-apart open position when desired. In the preferred embodiment, as best shown in FIGS. 4 and 7, the lower end of the tubular member 16 may be provided with an apertured cap 33 which closely, slidingly receives a guide rod or spindle 34 of a magnetic latching member, generally designated 35. The guide rod 34 has a spring-retaining washer 36 fixed to its upper end which retains a coil spring 37 in operative embracing relationship with the guide rod 34 so that the coil spring 37 bears between the inner face of the cap 33 and the lower face of the washer 36.

As shown in FIG. 4, the lower end of the telescoping rod 17 is illustrated in its lowermost position and is locked in this position by the clamp member 23. When in this lowermost position, the bottom end of the telescoping rod 17 bears upon the reduced portion of the spindle 34 to depress the magnetic latching member 35 and its spindle 34 and to compress the coil spring 37. When the latching member 35 is depressed in this manner, it is placed in its latching position.

The latching is effected herein magnetically. The member 35 preferably includes a flat disc-like ceramic magnet 38 which may have a pair of annular discs 40 and 41 of ferrous material positioned on its opposite faces. A washer 42 of non-magnetic material is preferably disposed above a retaining washer 43, and a threaded bolt 44 passes through central apertures (not shown) in the retaining washer 43, the washer 42, the two discs 40 and 41 and the ceramic magnet 38, and is threadably received in an opening in the spindle 34 to hold the latching member 35 in assembled relation.

Peripheral portions of the two discs 40 and 41 preferably extend out beyond the periphery of the ceramic magnet 38 and are of such size and are positioned to contact cooperating latching elements, generally designated 45, on each of the leg members 24. The discs 40 and 41, being of ferrous material, are, of course, given magnetic properties by the ceramic magnet 38.

The latching elements 45 are best shown in FIGS. 3 and 4. Each of the elements 45 includes a pair of spaced legs 46 which make a snug fit with the inner faces of each of the channel-shaped leg members 24. Each of the latching elements 45 is retained in position by a rivet 47.

The pairs of legs 46 of each of the latching elements 45 are joined by a cross-piece 48 which has an exposed concave latching surface or face 50 preferably shaped to receive in intimate mating contact the peripheral faces or edges of each of the discs 40 and 41. Thus, the latching surfaces 50 adhere to the peripheral edges of the discs 40 and 41 and hold the leg members in closed position adjacent the standard. The contacting areas on the latching surface 50 and on the peripheral edges of the discs 40 and 41 may be varied depending upon the strength of the ceramic magnet 38 and the weight and the size of the leg members 24 which are to be retained or latched adjacent the standard.

As best seen in FIGS. 3 and 4, each of the latching elements 45 has an upwardly and inwardly extending integral tongue 49 of metal affording an exposed camming surface 51 whose purpose will next be explained in connection with the operation of the preferred embodiment.

Consider first that the portable movie screen is in the position shown in FIG. 1. In order to collapse the movie screen for storage, the flexible screen is first rewound upon the reel within the casing 14. The casing is then swung upwardly to a position parallel with the standard 10 so that a projection 52 on the bail support 18 is disposed directly above the end of the casing 14 for insertion in a depression in the end of the casing 14 in a conventional manner. The telescoping rod 17 is then depressed so that the projection 52 enters the depression in the end of the casing 14, and the rod 17 is latched in its depressed position by the clamping member 23 to hold the casing 14 adjacent the standard 10.

When the rod 17 is depressed, its lower end (see FIG. 4) engages the upper end of the spindle 34 as previously described, and moves the magnetic latching device downwardly into its latching position. Thus when the collar 26 of the leg unit 11 is moved upwardly to swing the legs inwardly adjacent the standard, the magnetic latching device 35 is positioned to engage the latching surface 50 of the latching element 45 and to retain the leg members 24 in closed latched position adjacent the standard.

When it is desired to once more place the movie screen in operative position, it is only necessary to depress or release the clamp member 23. Release of the clamp 23 permits the telescoping rod 17 to be urged upwardly by the force of the compressed coil spring 37 which releases the casing 14 and permits it to pivot to its horizontal position (shown in FIG. 1). Also, when the telescoping rod 17 is released, the coil spring 37 urges the magnetic latching device 35 upwardly so that the peripheral edges of the discs 40 and 41 contact the camming surfaces 51 on each of the leg members 24 and throw the leg members 24 and their bracing links 27 outwardly to supporting position.

It should be noted that the discs 40 and 41 may be varied in size as desired so that the angular position of the leg members 24, in latched position, with respect to the standard 10 may be closely controlled or regulated. Thus when the leg members 24 are released from latched position, they readily move by gravity to supporting position without the necessity of auxiliary springs in the leg members to aid such opening movement.

The ceramic magnet 38 is of the permanent type and is given the name "ceramic" because it possesses a great many of the physical characteristics of other materials in the ceramic family. The basic ingredients of such magnets are the common materials, barium carbonate and iron oxide, which cooperate to impart the ceramic-like physical properties to such magnets. Thus, ceramic magnets are electrically non-conductive, hard and brittle, and have a low specific gravity in comparison to other permanent magnets, such as "Alnico" magnets. While "Alnico" magnets are metallic alloys of aluminum, nickel and iron (aggregated occasionally with cobalt, copper or titanium), a ceramic magnet is simply a non-metallic binder material (such as borium carbonate) interspersed or mixed with an iron oxide, the mixture being compressed and sintered to form the magnetic material.

A modified form of latching mechanism for the leg unit 11 is shown in FIGS. 6 and 8. The leg unit itself is generally similar to the leg unit in the first embodiment, and corresponding parts will be similarly designated.

However, it will be noted that the leg unit 11 in the second embodiment is mounted for limited longitudinal sliding movement of the standard 10 when the leg unit is in closed position. While the collar 26 is still freely slidable within its limits on the standard, the lower fitting 31 is in this case mounted for slight longitudinal movement by a pin 60 which secures the fitting 31 to the standard 10 and which is adapted to slide with the fitting 31 a limited distance in longitudinal slots 61 which are formed in opposite faces of the standard 10.

A compression spring 62 is confined in the lower end of the tubular member 16 between the apertured cap 33 and the transverse stop 63 which extends through the tubular member 16. The pin 60 is interposed between a pair of adjacent convolutions of the coil compression spring 62 so that the spring 62 preferably normally holds the pin 60 in its uppermost position in the slot which in turn holds the fitting 31 in its uppermost position on the tubular member 16.

In the modified showing, the magnetic latching member 35 is attached in stationary position to the cap on the lower end of the standard 10 by a rivet 65 which passes through apertures in the two ferrous discs or plates 40 and 41, the ceramic magnet, and the washer of non-magnetic material 42.

In order to unlatch the leg unit 11 shown in FIG. 6, from closed position, it is necessary to utilize the limited relative movement of the leg unit with respect to the standard. Referring to FIGS. 6 and 8, a downward force is exerted upon the collar 26 which forces the leg unit downwardly of the standard so that the camming surfaces 51 are brought into contact with the peripheral edges of the discs 40 and 41 of the magnetic latching device 35 which urges the free ends of the leg members of the leg unit outwardly releasing them from the magnetic grasp of the latching device 35, and allowing the leg unit 11 to go to supporting position.

When the downward pressure on the collar 26 is released, the fitting 31 on the leg unit 11 resumes its uppermost position under the impetus of the coil spring 62 so that the latching surfaces 50 are automatically repositioned for magnetic engagement with the latching member 35. Therefore, to latch the leg members once more in closed position, it is merely necessary to lift the collar 26 so that the latching surfaces 50 are brought into intimate contact with the peripheral edges of the magnetic latching device 35 to hold the leg members adjacent the standard.

The foregoing detailed description is given for clearness of understanding only and no unnecessary limitations should be understood therefrom for some modifications will be obvious to those skilled in the art.

I claim:

1. A portable stand comprising: a standard; a plurality of leg members for supporting the standard in upright position, each of said leg members being hinged to said standard for movement from a closed position adjacent the standard to an outwardly spread supporting position; and latching means acting between each of said leg members and the standard for retaining said leg members in closed position adjacent the standard, said latching means including a magnetic latching member on the standard comprising a ceramic magnet and a ferrous portion extending outwardly of its periphery, and latching elements of ferrous material on each of the leg members, said latching elements and said ferrous portion of the magnetic latching member being position so as to be brought into abutting latching engagement when the leg members are swung to closed position to retain the leg members in closed position.

2. A portable stand as specified in claim 1 in which the magnetic latching member is mounted for relative movement with respect to the latching elements when the leg members are in closed position, whereby said relative movement will cause disengagement of the latching elements from abutting latched position to release the leg members for swinging movement toward supporting position.

3. A portable stand, comprising: a standard; a leg unit for supporting the standard in upright position, said leg unit including a plurality of leg members each swingably secured to the standard for movement from a closed position adjacent the standard to an outwardly spread supporting position; and cooperating latching members on the leg unit and on the standard positioned for abutting latching engagement when the leg members are moved to closed position, one of said latching members having magnetic properties and the other of said latching members being of ferrous material, said one latching member including a ceramic magnet and a ferrous portion adapted to abuttingly engage the other of the latching members to retain the leg members in closed position.

4. A portable stand, comprising: a standard; a leg unit for supporting the standard in upright position, said leg unit including a plurality of leg members each swingably secured to the standard for movement from a closed position adjacent the standard to an outwardly spread supporting position; and cooperating latching members on the leg unit and on the standard positioned for abutting latching engagement when the leg members are moved to closed position, one of said latching members having magnetic properties and the other of said latching members being of ferrous material, said one latching member being a permanent magnet formed from a ferromagnetic material and a non-conductive, non-metallic binder, the permanent magnet having a ferrous portion adapted to abuttingly engage the other of the latching members to retain the leg members in closed position.

5. In a portable stand, comprising: a standard; a leg unit for supporting the standard in upright position, said leg unit including a plurality of leg members each being swingably secured to the standard for movement from a closed position adjacent the standard to an outwardly spread supporting position; cooperating latching members on the leg unit and on the standard positioned for abutting latching engagement when the leg members are moved to closed position, one of said latching members having magnetic properties and the other of said latching members being of ferrous material, said latching members being relatively movable with respect to each other axially of the standard when the leg unit is in closed position; and cam means positioned adjacent the latching members when the leg members are in closed position so that relative movement between the latching members causes the cam means to force said latching members apart to release the leg members for movement to supporting position.

6. A portable stand, comprising: a standard; a leg unit for supporting the standard in upright position, said leg unit including a plurality of leg members each swingably secured to the standard for movement from a closed position adjacent the standard to an outwardly spread supporting position; a magnetic latch member secured to the lower end portion of the standard, said magnetic latch member including a ceramic magnet and a ferrous portion extending about the periphery of the ceramic magnet; and an element of ferrous material positioned on each of the leg members for abutting latching engagement with said ferrous portion of the magnetic latch member when the leg members are swung to closed position to retain the leg members adjacent the standard.

7. A portable stand comprising: a standard; a leg unit for supporting the standard in upright position, said leg unit including a plurality of leg members and corresponding bracing links, each leg member being hinged to the standard for movement from a closed position adjacent the standard to an outwardly spread supporting position and each bracing link being hinged at one end to its corresponding leg member and at the other end to the standard for movement with said leg members; a magnetic latching member secured axially of the standard, said member including a pair of plates of ferrous material and a ceramic magnet, said ceramic magnet being disposed between said plates for holding the plates in spaced relationship, said plates having peripheral portions extending outwardly of the periphery of the ceramic magnet; and an element on each of the leg members having an exposed surface of ferrous material positioned for abutting engagement with the peripheral portions of the plates when the leg members are swung to closed position to retain releasably the leg members in closed position adjacent the standard.

8. A portable stand comprising: a standard; a leg unit for supporting the standard in upright position, said leg unit including a plurality of leg members and corresponding bracing links, each leg member being hinged to the standard for movement from a closed position adjacent the standard to an outwardly spread supporting position and each bracing link being hinged at one end to its corresponding leg member and at the other end to the standard for movement with said leg members; a magnetic latch member secured axially of the standard, said member including a pair of plates of ferrous material and a ceramic magnet, said ceramic magnet being disposed between said plates for holding the plates in spaced relationship and said plates having peripheral portions extending outwardly of the periphery of the ceramic magnet; and an element of ferrous material positioned on each of the leg members for abutting engagement with the peripheral portions of the plates when the leg members are swung to closed position to retain releasably the leg members in closed position adjacent the standard.

9. A portable stand comprising: a standard; a leg unit for supporting the standard in upright position, said leg unit having a plurality of leg members hinged for movement from an outwardly spread position to a closed position adjacent the standard, said entire leg unit being mounted for limited slidable longitudinal movement in relation to said standard; and cooperating latching members on the leg unit and the standard positioned for abutting engagement when the leg members are moved to closed position, one of said latching members having magnetic properties and the other of said latching members being of ferrous material, said latching members having engaging surfaces of sufficient area to retain the leg members in closed position when said latching members are brought into contact, relative longitudinal movement of said entire leg unit moving said engaging surfaces out of contact with said one latching member to release the leg members and permit them to be swung to outwardly spread supporting position.

10. A portable stand comprising: a standard; a leg unit for supporting the standard in upright position, said leg unit having a plurality of leg members hinged for movement from an outwardly spread position to a closed position adjacent the standard, said entire leg unit being mounted for limited slidable longitudinal movement in relation to said standard; cooperating latching members on the leg unit and the standard positioned for abutting engagement when the leg members are moved to closed position, one of said latching members having magnetic properties and the other of said latching members being of ferrous material, said latching members having engaging surfaces of sufficient area to retain the leg members in closed position when said latching members are brought into contact; and cam means positioned to coact with said leg members and latching members whereby relative longitudinal movement of said leg unit will cause said cam means to urge said leg members outwardly to disengage said latching members and permit the leg members to be swung to supporting position.

11. A portable stand, comprising: a standard; a leg unit for supporting the standard in upright position, said leg unit having a plurality of leg members hinged for movement from an outwardly spread position to a closed position adjacent the standard, said entire leg unit being mounted for limited slidable movement in relation to said standard; a magnetic latching member secured adjacent the lower end of the standard; a latching element of ferrous material on each of the leg members, said elements being positioned to abuttingly engage the magnetic latching member when the leg members are swung to closed position to retain releasably the leg members in said closed position; and a cam member mounted on each leg member adjacent a latching element, each cam member having an exposed camming surface extending inwardly toward the standard, whereby relative longitudinal movement of said entire leg unit in closed position causes said camming surfaces to engage said magnetic latching member to release the elements from the latching member, and throw said leg members outwardly of the standard and permit them to be swung to supporting position.

12. A portable stand, comprising: a standard; a leg unit for supporting the standard in upright position, said leg unit having a plurality of leg members hinged for movement from an outwardly spread position to a closed position adjacent the standard, said entire leg unit being mounted for limited slidable movement in relation to said standard; a magnetic latching member secured adjacent the lower end of the standard, said latching member including a ceramic magnet having ferrous portions extending outwardly of its periphery; a latching element of ferrous material on each of the leg members positioned to abuttingly engage said ferrous portions when the leg members are swung to closed position, said elements each having exposed surfaces shaped to mate with said ferrous portions and magnetically retain the leg members in said closed position; and a cam member mounted on each leg member adjacent a latching element, each cam member having an exposed camming surface extending angularly inwardly toward the standard, whereby relative longitudinal movement of said entire leg unit causes said camming surfaces to engage said magnetic latching member to release the elements from the latching member, and throw said leg members outwardly of the standard and permit them to be swung to supporting position.

13. A portable stand, comprising: an elongated tubular member; a telescoping rod slidably received in said tubular member; latching means on the tubular member engageable with said telescoping rod to retain said telescoping rod in varying positions of extension; a plurality of leg members for supporting the tubular member in the upright position, each of said leg members being hinged to said tubular member for movement from a closed position adjacent the tubular member to an outwardly spread supporting position; a magnetic latching member secured adjacent the lower end of the tubular member and being movable between a latching position and a releasing position, said latching member being normally urged toward said releasing position, said telescoping rod being of such length as to contact and depress said latching member into latching position; and latching elements of ferrous material on each of the leg members positions to abuttingly engage the magnetic latching member when in latching position to retain the leg members in closed position, whereby release of the latching means on the tubular member permits the telescoping rod to be moved upwardly by said magnetic latching member so that the magnetic latching member will move to releasing position and out of engagement with said latching elements to permit the leg members to be swung to supporting position.

14. A portable stand, comprising: an elongated tubular member; a telescoping rod slidably received in said tubular member; latching means on the tubular member engageable with said telescoping rod to retain such telescoping rod in varying positions of extension; a plurality of leg members for supporting the tubular member in upright position, each of said leg members being hinged to said tubular member for movement from a closed position adjacent the tubular member to an outwardly spread supporting position; a magnetic latching member secured adjacent the lower end of the tubular member and being movable between a latching position and a releasing position; spring means normally urging said latching member toward said releasing position, said telescoping rod being of such length as to contact and depress said latching member into latching position against the action of said spring means; latching elements of ferrous material on each of the leg members positioned to abuttingly engage the magnetic latching member when in latching position to retain the leg members in closed position; and cam means on the leg members positioned above the magnetic latching member when the leg members are in closed latched position, whereby release of the latching means on the tubular member permits the telescoping rod to be moved upwardly causing the magnetic latching member to move toward releasing position and into engagement with said cam means to throw the leg members outwardly toward supporting position.

References Cited in the file of this patent

UNITED STATES PATENTS

| | | |
|---|---|---|
| 1,777,610 | Gearhart | Oct. 7, 1930 |
| 2,659,559 | Du Mais | Nov. 17, 1953 |
| 2,791,346 | Tell | May 7, 1957 |
| 2,864,577 | Du Mais | Dec. 16, 1958 |
| 2,950,139 | Carbary | Aug. 23, 1960 |